United States Patent [19]

Thomas

[11] 4,320,305

[45] Mar. 16, 1982

[54] METHOD AND VOLTAGE SOURCE FOR PRODUCING A SMOOTHED VOLTAGE FROM THREE-PHASE CURRENT

[75] Inventor: Friedrich W. Thomas, Hasselroth, Fed. Rep. of Germany

[73] Assignee: Leybold Heraeus GmbH, Cologne, Fed. Rep. of Germany

[21] Appl. No.: 124,684

[22] Filed: Feb. 26, 1980

[30] Foreign Application Priority Data

Feb. 27, 1979 [DE] Fed. Rep. of Germany ....... 2907580

[51] Int. Cl.³ .............................................. H02M 7/19
[52] U.S. Cl. .......................................... 307/6; 307/77; 307/75; 363/87; 323/270
[58] Field of Search ................... 363/87, 89; 307/5, 6, 307/4, 8, 44, 45, 75, 77, 78, 151; 323/270

[56] References Cited

U.S. PATENT DOCUMENTS 2,304,552 12/1942 Deerhake ................................. 307/6
3,704,408 11/1972 Schroeder .............................. 363/87

Primary Examiner—Michael L. Gellner
Assistant Examiner—James L. Dwyer
Attorney, Agent, or Firm—Sprung, Felfe, Horn, Lynch & Kramer

[57] ABSTRACT

A method and an apparatus for converting a three phase input into a constant voltage to a load, which voltage is substantially free of harmonics and ripples includes dividing the voltage to the load into two component voltages, with one component voltage comprising at least 80% of the total. The one component voltage is maintained constant and load independent. The voltage to the load is compared to a first reference voltage to obtain the difference therebetween and the value of the other component voltage is adjusted to minimize the difference. The two component voltages are added to form the voltage to the load.

4 Claims, 2 Drawing Figures

METHOD AND VOLTAGE SOURCE FOR PRODUCING A SMOOTHED VOLTAGE FROM THREE-PHASE CURRENT

BACKGROUND OF THE INVENTION

The present invention relates to a method and a voltage source for producing a constant voltage "U" largely free of harmonics or ripples from three-phase current by using smoothing devices and relates in particular to high voltage power supplied for electron beam sources.

A pulsating direct current whose ripple can be reduced by smoothing devices, such as for example capacitors, can be produced from three-phase current be rectification. In the case of electron beam guns which are used for material processing and treatment such as welding, boring, milling, melting and vaporization, the size and position of the so-called focal spot on the material to be processed must be maintained as accurately as possible. By the term "focal spot" is meant that part of the material surface that is struck by the electron beam. The cross-section of the focal spot accordingly corresponds to the beam cross-section which, on account of the laws of electron optics image formation, is proportional to the projection of the beam source (cathode). In electron gun beams it is, above all, the quality of the high voltage power supply that determines the quality of the focal spot. In this connection, by the term "quality of the high voltage power supply" is meant its harmonic nature or ripple and its settling rate when subjected to disturbances, high quality meaning low ripple and rapid settling rate. This quality can be improved either by using electron tubes on the high voltage side or by using transistors in various circuits on the primary side of the high voltage power transformer. Electron tubes can be used only to a limited extent, however, on account of their high-voltage dielectric strength, heat production and service life. The use of transistors is restricted on account of their load limitation.

SUMMARY OF THE INVENTION

The object of the invention is to provide a regulating method, for producing a constant voltage U substantially free from ripples and harmonics from three-phase current, which is compatible with semi-conductor control elements and is at the same time able to adjust, with a quick response time, electrical outputs of an order of magnitude such as are required, for example, for the power supply for electron beam sources.

This and other objects, of the invention are achieved by a method according to the invention for producing from three-phase current a constant voltage U substantially free from harmonics and ripples wherein the voltage U is divided into two component voltages $U_1$ and $U_2$, the component voltage $U_1$ being at least 80% of the voltage U, maintaining the component voltage $U_1$ constant and load-independent, detecting the voltage U and comparing it with a reference voltage $U_s$, using the difference $dU + U$ to readjust the component voltage $U_2$ in such a way that the instantaneous values of dU are minimized, and additively feeding the component voltages $U_1$ and $U_2$ as voltage U to a load.

The invention is in principle based on effecting a voltage division and power distribution and regulating only a small part of the total power output, defined by the ratio of the component voltages, in such a way that the residual harmonics are at a minimum. In this way it is possible with an extremely small regulating power input to produce a very constant d.c. voltage that is ideally suited for the power supply to electron beam sources, and will provide a focal spot having substantially constant characteristics.

In accordance with further objects of the invention there is provided a voltage source according to the invention for producing from three-phase current a constant voltage U substantially free from harmonics and ripples, the voltage source comprising: a first component voltage source for producing a voltage $U_1$ including a three-phase transformer having primary and secondary windings, a final control element connected to feed the primary windings, rectifier connected to the secondary windings, a voltage regulator connected to feed the input of the final control element and a comparator for feeding the input of the voltage regulator with a difference voltage dU, derived from reference input $U_{s1}$ and a component voltage input $U_1$; a second voltage component voltage source for producing a voltage $U_2$ including a second transformer having a primary winding and a secondary winding, a second final control element connected to feed the primary winding of the second transformer, a second rectifier fed by the secondary winding of the second transformer, a smoothing capacitor connected to the second rectifier, a second voltage regulator connected to feed the input of the second final control element; and a second comparator stage connected to feed the input of the second voltage regulator with a difference voltage dU derived from the voltage U and a reference voltage $U_s$; and means for combining the voltages $U_1$ and $U_2$ to produce voltage U.

One embodiment of a circuit and its principle of operation are described in more detail hereinafter with the aid of FIGS. 1 and 2, wherein:

DETAILED DESCRIPTION OF THE INVENTION

Figure 1:
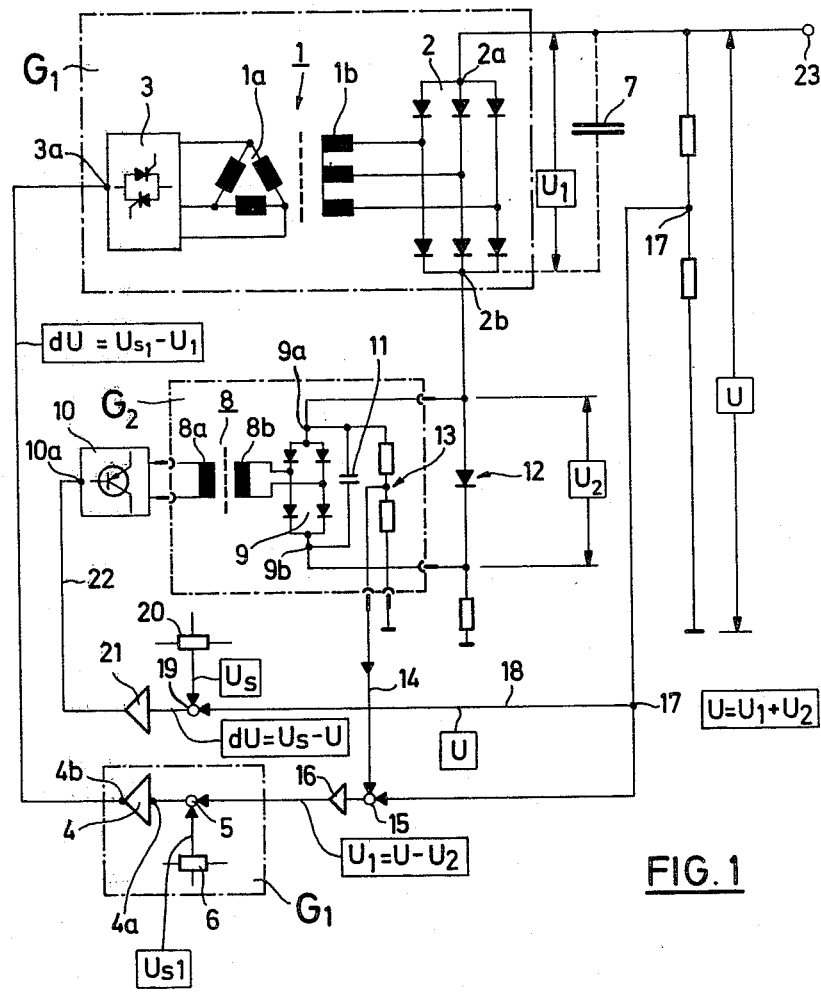
FIG. 1 is a circuit of a voltage source according to the invention.

According to FIG. 1, the circuit of the invention comprises of two component voltage sources $G_1$ and $G_2$. The component voltage source $G_1$ includes a three-phase transformer 1 with a primary 1a and a secondary 1b, a rectifier 2 with the outputs 2and 2b, as well as a thyristor final control element 3 with an input 3a and three outputs (not described in more detail), connected to the primary 1a. The component voltage source $G_1$ also includes a voltage regulator 4, whose input 4a is connected to a comparator 5 that receives its reference value (component reference voltage) $U_{s1}$ via a voltage reference element 6. The output 4b of the voltage regulator 4 is connected to the input 3a of the control element 3.

Figure 2:
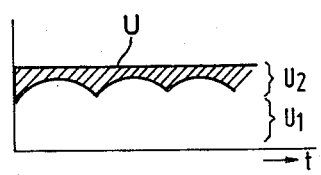
FIG. 2 shows the time behavior of the component voltages $U_1$ and $U_2$, as well as the total voltage U produced by the circuit of FIG. 1.

The voltage difference between the outputs 2a and 2b of the rectifier 2 is the component voltage $U_1$, which constitutes at least 80%, preferably 90 to 95%, of the total voltage output U of the circuit. The waveform of the component voltage $U_1$ is shown in FIG. 2. A smoothing device of known type, e.g. a capacitor 7, may also be arranged parallel to the rectifier 2, and the capacitance of the capacitor is chosen so that on the one hand the harmonic nature of the component voltage $U_1$ is sufficiently small, and on the other hand the output of the regulating stage, to be described in more detail hereinafter, is kept as low as possible.

The component voltage source $G_2$ includes a single-phase transformer 8 with a primary 8a and a secondary 8b, a rectifier 9 with the outputs 9a and 9b, and also a control element 10 on the low voltage side of the transformer 8, which, in the present case, is a pulse-width modulated transistor stage. A capacitor 11 is also provided across 9a and 9b in order to smooth the rectified voltage. A diode 12 is arranged parallel to the reactifier 9 in order to allow the output of the component voltage source $G_2$ to be added to the output of the component voltage source $G_1$. The voltage difference between the outputs 9a and 9b of the rectifier 9 is the component voltage $U_2$. A voltage divider 13 is provided for tapping part of the output $U_2$ to obtain a signal representative thereof. A lead 14 runs from the voltage divider to a subtraction element 15 which feeds a series connected amplifier 16, whose output is connected to the comparator 5 and thus to the voltage regulator 4 and final control element 3.

The voltage $U=U_1+U_2$ which is at the output terminal 23 is detected by a further voltage divider which produces a proportionally reduced voltage representative of voltage U at 17. A signal representative of the component voltage $U_1$ is obtained by electronic subtraction in the subtraction 15. By comparison with the reference value $U_{s1}$ in the comparator 5, the component voltage $U_1$ at the output of the rectifier 2 is maintained constant independently of the load, via the voltage 4 and the final control element 3.

A signal representative of the total voltage U is conveyed via a lead 18 to a comparator stage 19 to which is also applied, by means of voltage reference element 20, the reference voltage value $U_s$ for the total voltage U. The output from the comparator 19 is connected to a further voltage regulator 21 joined to the input 10a of control element 10 by a lead 22. The component voltage $U_2$, whose time behavior characteristic is also shown in FIG. 2, is thus regulated in such a way that the total voltage U can be represented by a straight line (FIG. 2).

The two voltage regulators 4 and 21 are designed in such a way that their regulation rates differ by orders of magnitude such as to produce a good decoupling effect between the voltage regulators 4 and 21. By virtue of the rapidity and accuracy of the regulating circuit of the component voltage source $G_2$, the need for smoothing devices (capacitor 7) for the component voltage source $G_1$ can be considerably reduced. As can be seen from FIG. 2, the harmonic character of the component voltage source $G_1$ is filled out by means of the voltable $U_2$ of the component voltage source $G_2$. The voltage smoothed in this way is fed via the output terminal 23 to a high voltage load (not shown).

It will be appreciated that the instant specification and claims are set forth by way of illustration and not limitation, and that various modifications and changes may be made without departing from the spirit and scope of the present invention.

What is claimed is:

1. A method for converting a three phase input into a constant voltage to a load, which voltage is substantially free of harmonics and ripples, the method comprising continuously repeating in a closed loop, receptive of the three phase input, the steps of: dividing the voltage to the load into two component voltages, with one component voltage comprising at least 80% of the total; maintaining the one component voltage constant and load independent; comparing the voltage to the load to a first reference voltage to obtain the difference therebetween; adjusting the value of the other component voltage to minimize said difference; and adding the two component voltages to form the voltage to the load; and wherein the step of maintaining the one component voltage constant comprises subtracting the other component voltage from the voltage to the load, comparing the result to a second reference voltage, and regulating the magnitude of the three phase input seen by the closed loop to minimize any difference between the compared voltages.

2. A voltage source for converting a three phase input into a constant voltage to a load, which voltage is substantially free of harmonics and ripples, comprising: first means for producing a constant and load-independent first component voltage having a value of at least 80% of the voltage to the load; second means for producing a second component voltage controllably adjustable about a value equal to the difference between the voltage to the load and the first component voltage including third means for comparing the voltage to the load to a first reference voltage to obtain the difference therebetween and means for effecting adjustment of the second component voltage to minimize said difference; and means for adding the first and second component voltages to produce the voltage to the load; and wherein the first means for producing the first component voltage comprises means for subtracting the second component voltage from the voltage to the load to obtain the difference therebetween, fourth means for comparing the difference from the subtracting means to a second reference voltage and means for regulating the magnitude of the three phase input to the first means to minimize any difference between the voltages compared by the fourth comprising means.

3. The voltage source according to claim 2, wherein the first means comprises a three-phase transformer having primary and secondary windings, a first control element receptive of the three-phase input and connected to the primary of the transformer and a first rectifier connected to the secondary of the transformer wherein the means for subtracting comprises a voltage subtractor receptive of the second component voltage and the voltage to the load to obtain a difference signal to a second reference voltage and wherein the regulating means comprises a first voltage regulator receptive of the output of the first comparator and having its output connected to a control input of the first control element.

4. The voltage source according to claim 3, wherein the second means comprises a second transformer having primary and secondary windings, a second control element receptive of the three phase input and connected to the primary of the second transformer, a second rectifier connected to the secondary of the second transformer, and a smoothing capacitor connected across the output of the second rectifier, wherein the second comparing means comprises a second comparator for comparing the voltage to the load to the first reference voltage and wherein the adjusting means comprises a second voltage regulator receptive of the output of the second comparator and having its output connected to a control input of the second control element.

* * * * *